UNITED STATES PATENT OFFICE.

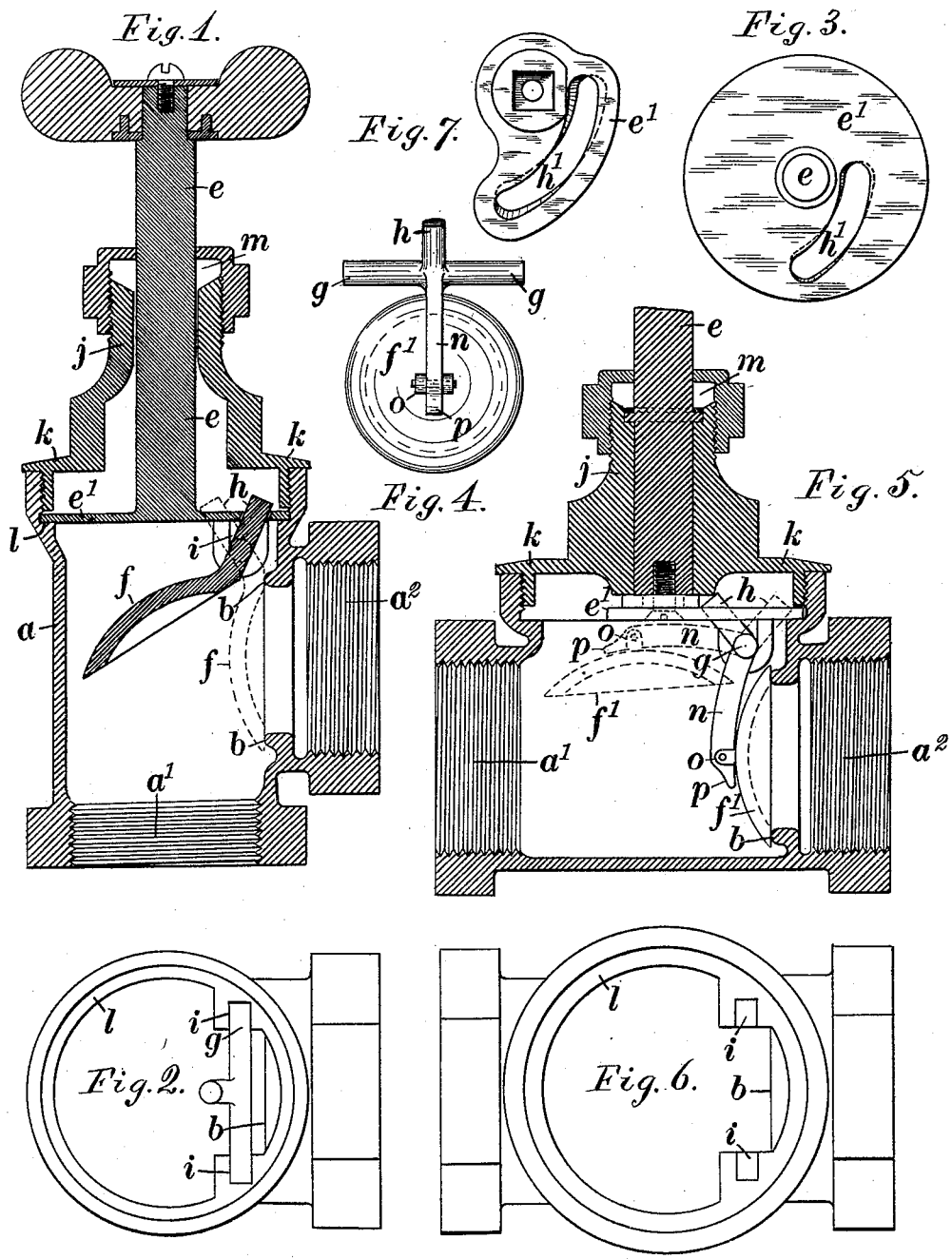

WILLIAM M. MACKAY, OF NEWARK, NEW JERSEY.

VALVE FOR SUPPLYING HOT-WATER RADIATORS AND FOR OTHER PURPOSES.

SPECIFICATION forming part of Letters Patent No. 452,453, dated May 19, 1891.

Application filed January 10, 1891. Serial No. 377,320. (No model.)

*To all whom it may concern:*

Be it known that I, WILLIAM M. MACKAY, a citizen of the United States, residing at Newark, Essex county, New Jersey, have invented certain new and useful Improvements in Valves for Supplying Hot-Water Radiators and for other Purposes, fully described and represented in the following specification and the accompanying drawings, forming a part of the same.

This invention relates to means for moving a valve to and from its seat upon a hinge or pivotal joint, by which the valve flap or disk may be wholly removed from the water-way to afford a clear channel for the passage of the fluid. The construction is thus especially adapted for hot-water valves to regulate the flow through hot-water radiators; but it is obvious that the invention may be applied to valves for steam, air, or other fluids.

In the drawings the invention is shown applied to an angle-valve for regulating a hot-water radiator, and also to a straight-way valve, which may be used for either steam or water.

In the drawings, Figure 1 is a vertical section of an angle-valve provided with my improvements. Fig. 2 is a plan of the body with the valve-flap therein and pressed toward the seat. Fig. 3 is a plan of the spindle with the plate having the actuating-slot. Fig. 4 is a front view of the valve-flap and its actuating-arm. Fig. 5 is a longitudinal section of a straight-way valve with a portion of the valve-stem omitted. Fig. 6 is a plan of the straight-way-valve body; and Fig. 7 is a plan of the valve-stem with segmental slotted plate, as shown in Fig. 5.

In Fig. 1, $a$ is the body of the valve with inlet-opening $a'$ at the bottom and outlet-opening $a^2$ at one side. A valve-seat $b$ is formed at the inner end of the outlet, and sockets $i$ are formed in the body adjacent to the seat to receive pivots $g$, cast upon a valve flap or disk $f$. Upon the opposite side of the pivots from the disk is projected an arm $h$, adapted to fit a slotted plate $e'$, attached to the valve-stem $e$. The valve-stem is projected through a stuffing-box $j$, which is formed upon a cap $k$, screwed into the body $a$ over the plate $e'$. The plate is shown circular in Fig. 1 and fitted to a seat $l$ beneath the cap, and the sockets $i$ are made open toward the plate to facilitate the casting of the body and the introduction of the pivots $g$, while the plate serves to cover the openings of the sockets and hold the pivots therein. An inclined slot $h'$ is formed in the plate to admit the arm $h$, and a partial rotation of the valve-stem and plate serves to throw the arm to or from the spindle and to thus move the valve-flap to or from its seat, as shown in the full and dotted lines in the drawings. With a flap-valve formed integral with the arm $h$ it is obviously difficult to press the valve accurately upon its seat to form a close joint upon the seat nearest to the pivots $g$, where the thrust upon the arm $h$ tends to press the pivot away from the valve-seat. This is, however, no detriment to the operation of a hot-water valve, as such valves are designed to maintain a slight circulation of the water in the radiators to prevent freezing.

When the valve is required to fit more tightly, it may be faced with a yielding packing or press upon a yielding seat, and a means of pressing it more perfectly upon its seat is shown in the straight-way valve in Fig. 5, where the plate $e'$ is shown projected from one side only of the spindle $e$ and formed with a slot adapted to turn the arm $h$ through an angle of ninety degrees to move the valve entirely clear from the water-way.

In Fig. 5 the pivots $g$ are formed with an arm $n$ upon the side opposite the arm $h$, and the valve flap or disk $f'$ is hinged to this arm by a pin and ears $o$, such as are common in similar constructions. A toe $p$ is projected from the arm $n$ adjacent to such pin to prevent the valve-flap from displacement, while permitting a sufficient motion of the flap upon the pin to adjust itself perfectly upon the seat $b$. The upper and lower edges of the valve-flap are by this construction pressed with equal force toward the seat, so as to make a tight joint therewith if suitable materials be employed for the valve or seat. The plate $e'$, when made circular, may be centered in the valve-body by a seat, as at $l$ in Fig. 1; but where it is made of segmental form or projected from one side only of the valve-stem $e$ the cap is provided, as in Fig. 5, with a bearing to center the valve-stem. It is, however, a simpler construction to fit the plate to move between the upper portion of the sockets $i$ and the under side of the cap, which thus prevents the longitudinal movement of the valve-stem without the use of a collar upon the stem, as shown in Fig. 5. The valve-stem is thus held from longitudinal movement, and the wear at the stuffing-box by longitudinal movement is wholly avoided, as well as the tendency to leakage, which is produced by such wear. The packing $m$ in the stuffing-box thus presses constantly upon the same part of the valve-stem, and when properly tightened to prevent leakage will remain tight for a great length of time. This arises from the very slight movement required to open and close the valve, which movement amounts to only one-fourth or one-sixth of a rotation for the valve-stem $e$. The valve may thus be opened and closed instantly, which insures the free circulation of the fluid through a hot-water radiator and avoids the imperfect circulation which frequently occurs when valves are employed that require numerous turns of the valve-stem to secure a full opening. The cost of manufacturing this construction is comparatively slight, as the parts are very simple and easily adjusted in their working position.

The straight-way valve shown in Fig. 5 may be taken to illustrate the application of the invention to thin pipes like stove and hot-air pipes, as the plate $e'$, if made circular, could be perforated, as is common in the sides of stove-pipes where a damper is inserted.

Other applications of the invention may be readily made by those skilled in the art.

It is immaterial how the valve-actuating arm be pivoted in the body of the valve, the pivots integral with the valve-actuating arm $h$ being the cheapest form to construct and best adapted to fit in the sockets $i$, which may be formed by casting them directly in the body.

I am aware that valves have been hinged to swing clear of the water-way, and I am also aware that a scroll-cam has been employed to move a valve with a supporting-carriage perpendicular to the valve-seat upon fixed bearings. With such a construction the valve, the carriage, and the scroll-cam are constantly held in the water-way of the cock, if it be a straight-way cock like that shown in Fig. 5 of my drawings; and the object of my invention is to secure a clear water-way whether the valve be an angle-valve or a straight-way valve. I hereby disclaim such previous constructions, as my invention consists in the valve-stem rotated at right angles to the water-way and provided with the plate $e'$, having the inclined slot $h'$, and the valve-carrying arm pivoted adjacent to the plate $e'$ and provided with an arm fitted to the inclined slot and movable in a plane perpendicular to the plate $e'$.

Having thus set forth my invention, what I claim herein is—

1. A valve comprising the valve-body $a$, provided with the valve-seat $b$, and having the valve-stem $e$, rotated at right angles to the water-way through such valve-seat, and provided with the plate $e'$, having the inclined slot $h'$, the valve-carrying arm pivoted adjacent to the plate $e'$ and projected through the slot $h'$, and the valve flap or disk attached to the arm and moved thereby to and from the seat, as and for the purpose set forth.

2. The combination, with the valve-body having the valve-seat $b$, of the open sockets $i$ adjacent to the valve-seat, an arm having the pivots $g$ fitted in such sockets and having a valve flap or disk attached thereto and movable to and from the seat, and the valve-stem $e$, rotated at right angles to the water-way through the valve-seat and provided with the plate $e'$, having the inclined slot $h'$ fitted to the arm, as and for the purpose set forth.

3. The combination, with the valve-body having the valve-seat $b$, of the open sockets $i$ adjacent to the valve-seat, the seat $l$ adjacent to the sockets, the circular plate $e'$, held movably upon such seat by the cap $k$ and provided with the valve-stem $e$ and inclined slot $h'$, the valve-actuating arm $h$, pivoted in the sockets and extended through the slot $h'$, and the valve flap or disk moved by the arm to or from its seat, substantially as set forth.

In testimony whereof I have hereunto set my hand in the presence of two subscribing witnesses.

WILLIAM M. MACKAY.

Witnesses:
THOS. S. CRANE,
HENRY J. MILLER.